United States Patent Office 3,556,810
Patented Jan. 19, 1971

3,556,810
DESSERT GEL AND GELLING AGENT THEREFOR
Arthur L. Moirano, Mountainside, N.J., assignor to Marine Colloids, Inc., Springfield, N.J., a corporation of Delaware
No Drawing. Filed May 14, 1969, Ser. No. 824,674
Int. Cl. A23l 1/04
U.S. Cl. 99—131       10 Claims

ABSTRACT OF THE DISCLOSURE

An improved gelling agent for an aqueous dessert gel is provided by employing in combination (a) calcium reactive low methoxyl pectin, (b) locust bean gum, (c) potassium-sensitive gum selected from the group consisting of potassium-sensitive carrageenan and furcellaran, and (d) calcium-sensitive carrageenan. While the gelling agent has unique advantages in the production of aqueous desert gels, the gelling agent is of a special utility in the production of aqueous dessert gels containing chunks of fruit.

THE FIELD OF THE INVENTION

This invention relates to edible dessert gels and gelling agents therefor. It relates more especially to gelling agents suitable for the production of aqueous dessert gels.

BACKGROUND OF THE INVENTION

Aqueous dessert gels have enjoyed great popularity for many years. Many dessert gels have been produced commercially based on the use of gelatine as a gelling agent. Gelatine has the property when present in small amount of providing a gel having desirable physical properties as regards gel strength, flexibility and mouth feel. By the incorporation of suitable sweetening agents, flavor and color an attractive dessert gel is provided. If desired, chunks of fruit or other edible material may be added for inclusion in the gel with the exception, however, of fresh pineapple, which tends to liquefy a dessert gel based on the use of gelatine as a gelling agent. The principal practical disadvantage of gelatine as a gelling agent is that after the gelatine has been dissolved in hot water the resulting solution requires refrigeration in order to produce a gel. Moreover, there is a tendency for the gelatine sol to supercool below its normal gelling temperature without gelling, and this ordinarily necessitates prolonged refrigeration in order to obtain the dessert in readiness to be consumed. Gelatine does not lend itself to the production of desserts by a food processing concern followed by distribution through retailers requiring storage for substantial periods of time at room temperature. This consideration is especially important in connection with the commercial production of products sold for infant feeding in suitable containers.

In lieu of gelatine, various vegetable gums having the property of producing an aqueous gel have been resorted to. However, more is required for commercial acceptance than the property of producing an aqueous gel when dissolved in water. Thus it has long been known that the variety of carrageenan which has been produced extensively heretofore, namely, carrageenan produced from the sea plant *Chondrus crispus* (Irish moss) has water gelling properties which are greatly enhanced by the presence of potassium cations. Moreover, it is known that the water gelling properties of this type of carrageenan may be substantially enhanced by the lime treatment disclosed in Pat. No. 3,094,517. However, the gel which results from the employment of the extractive prepared from *Chondrus crispus* is of such a short and brittle character as not to be acceptable commercially.

In order to improve the physical properties of a dessert gel prepared using a carrageenan extractive obtained from *Chondrus crispus* it has been proposed to modify the physical characteristics of this extractive by employing it in combination with some other material. One such instance is described in Pat. No. 2,466,146 wherein there is disclosed a synergistic effect which results from combining locust bean gum with a carrageenan extractive prepared from *Chondrus crispus* and a potassium salt. Locust bean gum by itself is devoid of gel-forming properties. However, by virtue of its synergistic action with potassium-sensitive carrageenan derived from *Chondrus crispus* and a potassium salt a gel of adequate strength is provided which has flexible properties and has mouth feel comparable to that of a gelatine dessert. But the dessert gels disclosed in Pat. No. 2,466,146 have the great practical disadvantage of being subject to excessive syneresis.

In co-pending application Ser. No. 550,150 filed May 16, 1966 now Pat. No. 3,445,243 for Dessert Gel and Composition Therefor it is disclosed that by adding a calcium-sensitive carrageenan to the gel system based on locust bean gum a potassium-sensitive carrageenan and an edible potassium salt a dessert gel of desirable physical characteristics can be obtained wherein the syneresis is minimal or eliminated altogether. The terms "potassium-sensitive carrageenan" and "calcium-sensitive carrageenan" are described more in detail in said application and likewise hereinbelow.

Another proposal for overcoming the excessive shortness and brittleness of an aqueous gel prepared from an extractive derived from *Chondrus crispus* is disclosed in Pat. No. 3,342,612. It is disclosed in this patent that if instead of using a potassium-sensitive carrageenan one employs a calcium-sensitive extractive such as that obtaned from the seaweed variety *Eucheuma spinosum* a dessert gel is obtainable in the presence of calcium cations liberated from a soluble calcium compound which is notable for its elasticity and flexibility. Moreover, by blending some potassium-sensitive carrageenan with carrageenan which is calcium-sensitive the physical properties of the aqueous gel can be controlled as regards stiffness and flexibility over the range of that which finds commercial acceptance.

Another gelling agent that has been used for the production of aqueous gels is low methoxyl pectin. Low methoxyl pectin is sensitive to calcium cations and a gel may be produced by dissolving low methoxyl pectin in hot water, adding an appropriate amount of calcium ions, and permitting the solution to cool. If the gel is reheated, the gel may be more or less fluidized but upon cooling again the gel will reform. The gel as initially produced is quite brittle and fractures easily. The gel is subject to syneresis and particularly so if the level of calcium with which it is reacted is not optimized. The amount of low methoxyl pectin required to produce a given gel strength is relatively great and this makes the use of low methoxyl pectin as a gelling agent substantially more costly as compared with the gelling agent of this invention. Low methoxyl pectin also has the practical disadvantage that its high degree of sensitivity to calcium cations makes control of gel consistency difficult when using low methoxyl pectin with fruits and fruit juices. Since most fruits and fruit juices comprise at least some calcium and since the calcium content thereof may vary from time to time, it is very difficult to control the amount of calcium which is available in a given mix for reaction with the low methoxyl pectin for determining the consistency of the finished gel.

SUMMARY OF THE INVENTION

It is an object of this invention to provide a gelling agent which produces a gel having very desirable properties as regards strength and consistency as well as exhibiting little or no syneresis and which minimizes or overcomes drawbacks and shortcomings incident to prior proposals for the formulation of aqueous dessert gels.

It has been found according to this invention that substantial advantages and improvements are afforded by employing as the gelling agent the combination in controlled relative proportions of (a) low methoxyl pectin, (b) locust bean gum, (c) potassium-sensitive gum selected from the group consisting of potassium-sensitive carrageenan and furcellaran, and (d) calcium-sensitive carrageenan. The gel system also comprises soluble compounds of potassium for supplying potassium cations effective to induce gelation of the potassium gum selected from the group consisting of potassium-sensitive carrageenan and furcellaran and calcium cations effective to induce gelation of the calcium-sensitive carrageenan and the low methoxyl pectin.

As compared with the gel system disclosed in my application Ser. No. 550,150 containing potassium-sensitive carrageenan, locust bean gum and calcium-sensitive carrageenan, the additional presence of low methoxyl pectin is attended with a number of advantages which are not apparent from the nature of low methoxy pectin per se. Especially when the gelling agent is employed in connection with citrus fruit, the pH of the gel may be quite low and the presence of the low methoxyl pectin serves to improve the resistance of the gel to gradual hydrolysis which, if it occurs, degrades the gelling agent and results in the developing of syneresis.

Another advantage which is apparent upon tasting the gel is that there is improved flavor release. Some gelling agents such as carrageenan when conventionally used at a pH of about 4 or slightly higher have the tendency to hold back to a noticeable extent release of the natural fruit flavor and the presence of the low methoxyl pectin improves the flavor release from a fruit or fruit juice.

Another advantage of this invention is that commercial production is facilitated in that at the elevated temperatures at which the solution initially is formed the aqueous material containing the gelling agent is more fluid than when the low methoxyl pectin is not present.

A further advantage of this invention is that the gelling agent appears to be compatible with all commonly consumed fruits, including fresh pineapple.

The presence of the low methoxyl pectin tends to increase somewhat the resistance of the gel dessert to sagging when unmolded without, however, detracting from desired flexibility and mouth feel. While low methoxyl pectin when used alone tends to results in excessive syneresis, it has been found that when low methoxyl pectin is employed in the formulations of this invention the resulting aqueous gel exhibits little or no syneresis. In addition, it has been found that when the low methoxyl pectin is used in combination with the other ingredients, it produces a much more uniform calcium response. In other words, the level of calcium required to optimize the gel is now no longer as critical.

When attempt is made to employ low methoxyl pectin as the sole gelling agent difficulties are encountered due to the sensitivity of low methoxyl pectin to variations in calcium concentration. The proper amount of gelation is difficult to control and this is especially the case when preparing a gel using a natural fruit juice since variable results tend to occur, depending on varying amounts of calcium encountered as between different lots of fruit juice. The gelling agent of this invention is much less susceptible to such difficulties. It also has been found that when formulated according to the present invention a predetermined amount of gel strength can be obtained using an amount of total gelling agent that is much less than if low methoxyl pectin were to be employed alone. This provides a great saving in expense as compared with prior proposals for using low methoxyl pectin as the gelling agent.

The advantages of this invention may be realized when the components of the gelling agent are used in substantially the following relative proportions:

| | Percent |
|---|---|
| Low methoxyl pectin | 23–71 |
| Locust bean gum | 6.7–43 |
| Potassium-sensitive gum selected from the group consisting of potassium-sensitive carrageenan and furcellaran | 4.5–27 |
| Calcium-sensitive carrageenan | 9.6–46 | subject to the proviso that the amount of locust bean gum shall be at least half the amount of the potassium-sensitive gum.

Preferably the relative proportions of the components of the gelling agent of this invention are approximately as follows:

| | Percent |
|---|---|
| Low methoxyl pectin | 41 |
| Locust bean gum | 21 |
| Potassium-sensitive carrageenan | 13 |
| Calcium-sensitive carrageenan | 25 |

In the foregoing formulation the potassium-sensitive carrageenan may be replaced in whole or in part by furcellaran.

The term "potassium-sensitive carrageenan" as used herein and in the claims has reference to a carrageenan which, when dissolved so as to provide a 1.5% solution of the carrageenan in water containing an amount of potassium chloride in the range from 0.1% to 0.2% by weight, exhibits substantially greater gel responsiveness to the presence of potassium cations in the development of greater gel strength as compared to calcium cations supplied by a like concentration of calcium chloride. As aforesaid, the extractive prepared from *Chondrus crispus* is illustrative of one extensively produced potassium-sensitive carrageenan. The carrageenan derived from *Chondrus crispus* contains both kappa carrageenan and lambda carrageenan. It is the kappa carrageenan component which is sensitive to potassium cations and, if desired, the kappa carrageenan component can be used after the separation therefrom of lambda carrageenan. Other sea plants from which carrageenan of the kappa type having potassium sensitivity is obtainable are *Gigartina stellata, Gigartina pistillata, Gigartina canaliculate, Gigartina chamissoi, Eucheuma cottonii,* Hypnea, *Chondrus ocellatus, Eucheuma edule, Eucheuma striatum, Eucheuma okamura.*

Furcellaran exhibits properties similar to potassium-sensitive carrageenan for the purpose of this invention, including responsiveness to the presence of potassium cations in the development of water gel strength and may be used in lieu of or in any combination with potassium-sensitive carrageenan to provide the potassium-sensitive gum component of the gelling agent of this invention.

The term "calcium-sensitive carrageenan" as used herein and in the claims has reference to a carrageenan extract which when disposed in an aqueous solution of 1.5% concentration exhibits substantially greater gel responsiveness to calcium cations than to potassium cations in the presence of calcium chloride and potassium chloride, respectively, in an amount that is in the range from 0.1% to 0.2%. Calcium-sensitive carrageenan preferably is obtained as an extractive from the sea plants *Eucheuma spinosum* and *Agardhiella tenera*. Other examples of seaweeds from which calcium-sensitive carrageenan may be extracted are *Eucheuma serra*, *Eucheuma isiforme*, *Eucheuma muricatum* and *Eucheuma uncinatum*, *Gymnogongrus furcellatus*, *Ahnfeltia durvillaei*, *Gigartina papillata*.

While potassium-sensitive carrageenan, furcellaran and calcium-sensitive carrageenan may be employed in the form as conventionally extracted from the respective seaweeds containing them, it is preferable that they be subjected to the lime treatment at elevated temperature disclosed in Pat. No. 3,094,517 to increase their water gel forming potential. This is especially the case in connection with the potassium-sensitive carrageenan component. When potassium-sensitive carrageenan is employed which has not been subjected to lime treatment, then its use would be in the upper portion of the range therefor hereinabove given. Conversely, when lime-treated potassium-sensitive carrageenan is employed it may be employed in lesser quantity, since in the usual case the amount of lime-treated potassium-sensitive carrageenan that is required to provide a given water gel strength is only about half that which is required when employing potassium-sensitive carrageenan that has not been lime-treated. Lime treatment as disclosed in said patent effects a similar increase in the gel-forming capacity of a given quantity of furcellaran. The lime-treatment of the calcium-sensitive carrageenan is of much less significance than is the case with the potassium-sensitive carrageenan or furcellaran.

In the preparation of a fruit gel it is merely necessary to disperse the components of the gelling agent in cold water and then heat to a temperature of about 180° F. to effect solution. A fruit juice usually contains a small amount of potassium ions, e.g. 2 mg./gm. for orange and grapefruit juice. So that additional potassium cations may be present, an edible soluble potassium compound may be included such as potassium chloride or potassium citrate. If an aqueous medium such as a citrus fruit juice is employed which has a pH lower than about 3.5, potassium cations also may be provided by potassium hydroxide which is effective to raise the pH so as to be of the order of 3.5 to 4.0. In such case if the initial low pH is afforded by citric acid, the addition of potassium hydroxide reacts with the citric acid to form potassium citrate. Some potassium cations also occur in the potassium sensitive carrageenan. The amount of potassium cations should be adjusted so as to develop the gel potential of the potassium-sensitive gum. The potassium cations available for inducing gelation of the potassium-sensitive gum should be of the order of 100 to 2000 mg. per gram of potassium-sensitive gum and preferably is about 200 to 1200 mg. per gram of the potassium-sensitive gum.

Similar considerations apply to the inclusion of calcium cations so as to develop the gel potential of both the calcium-sensitive carrageenan and the low methoxyl pectin. A fruit juice usually contains a small amount of calcium, e.g. 10 mg./100 gms. for grapefruit juice and orange juice. If additional calcium is desired, this can be provided by a salt such as calcium chloride. If a sweetening agent having a lower caloric value than sugar is desired, then calcium cyclamate may be employed so as not only to impart sweetness but also provide a source of calcium cations. The amount of calcium which is present is adjusted to provide optimum desired gel strength, care being taken to avoid any excessive calcium which would adversely affect the gel strength. The available cations for inducing gelation of the low methoxyl pectin and the calcium-sensitive carrageenan should be of the order of 10 to 100 mgs. per gram of low methoxyl pectin and preferably is about 30 to 80 mgs. per gram of low methoxyl pectin.

The low methoxyl pectin which is employed in the practice of this invention, as this term is used herein and in the claims, is one which has a methoxyl content of from about 3% to about 6% on the weight of the pectin on the molecule.

Because of the presence of the low methoxyl pectin, a pH in the range of 3 to 4.2 may be employed which is favorable for bringing out tartness and flavor. In the absence of the low methoxyl pectin a somewhat higher pH would be required in order to provide adequate stability for the carrageenan.

In addition to the gel system, the dessert gel may and normally does contain suitable agents for imparting desired flavor and color. While the flavoring and coloring agents may be synthetic, it is one of the advantages of the present invention that the gel system affords a very satisfactory dessert gel when the aqueous medium is in the form of a fruit juice or a combination of fruit juice with fruit sections or chunks. The present invention is of special utility in the production of dessert gels prepared from citrus fruit juice and chunks or sections of citrus fruit. When citrus fruit is cut into sections which are sold as such, a certain amount of breakage of the sections occurs with resultant formation of irregular chunks. These chunks are, however, well suited for use in a dessert gel and the present invention enables this to be done very successfully. When the gel system is prepared with the fruit juice and fruit chunks the viscosity of the stabilizer system is sufficient to maintain suspension of the fruits during the filling and subsequent cooling operation where gelation then takes place.

In the preparation of a dessert gel in the practice of this invention it is preferable to provide initial solution of the gelling agent at a temperature above the gelling temperature of the low methoxyl pectin solution in the presence of only that quantity of calcium which may be present in the system in the absence of added calcium salt in order to minimize any effect of the added calcium salt in interfering with effective solution and dispersion of the low methoxyl pectin. However, so long as the amount of calcium in relation to the low methoxyl pectin is within the range above mentioned a satisfactory dessert gel may be produced upon adding all of the solid components of the finished gel simultaneously including added calcium salt. The invention lends itself, therefore, not only to gel production wherein the calcium salt is added last as, for example, on a large-scale commercial operation but also to the packaging of a dry mix of all the solid components of the dessert gel for simultaneous addition to hot water. However, when the dessert gel is made in this way the low methoxyl pectin is slightly more sensitive to the presence of calcium cations and it is preferable that the concentration of calcium cations be of the order of 20 to 40 mg. per gram of low methoxyl pectin. If a gel formulation results in excessive calcium content due, for example, to such causes as water having a high calcium content, fruit juice that is high in calcium and carrageenan that is high in lime, any calcium in relation to low methoxyl pectin that is in excess of the relative proportions hereinabove mentioned may be removed by the employment of a calicum sequestrant such as sodium hexameta phosphate in sufficient quantity to react with the excess calcium. This is particularly desirable in the case of the dry mix wherein it is desirable to have the amount of calcium in the aforesaid range of the order of 20 to 40 mg. per gram of low methoxyl pectin and thereby control the rate of reaction between the calcium ions and the low methoxyl pectin.

Since the gelling temperature of the gel system employed according to this invention is well above normal room temperature, it follows that when preparing a dessert gel in the practice of this invention no refrigeration is required. Moreover, the gel may be stored at room temperature and the gel is sufficiently stable to permit commercial production of gel preparations in suitable containers and the sale thereof through retail stores.

The following is an illustrative example of the practice of this invention in connection with a gel containing both the juice of citrus fruit and sections or chunks of citrus fruit:

EXAMPLE 1

| | Grams | Percent |
|---|---|---|
| Low methoxyl pectin | 29.46 | 0.370 |
| Locust bean gum | 14.73 | 0.185 |
| Potassium-sensitive carrageenan | 8.87 | 0.111 |
| Calcium-sensitive carrageenan | 17.75 | 0.223 |
| Calcium cyclamate | 16.92 | 0.212 |
| Potassium hydroxide | 18.82 | 0.236 |
| Citrus juice | 3,932.00 | 49.319 |
| Citrus sections | 3,932.00 | 49.319 |
| Orange oil emulsion | 2.00 | 0.025 |

The gel was prepared by incorporating with the citrus juice all of the other components with the exception of the fruit sections and the calcium cyclamate and heating to a temperature of about 180° to 190° C. until their solution in the juice was complete. The calcium cyclamate was then dissolved in the juice. Lastly, the fruit sections were added and the mixture was reheated to sterilizing temperature. Thereupon the mixture was permitted to cool in a suitable mold with attendant gelation. The resulting gel unmolded well and had desirable properties of gel strength, flexibility, mouth feel and freedom from syneresis. The fruit sections were distributed substantially uniformly and the product had excellent flavor. Since the sensitivity of the low methoxyl pectin to the presence of calcium cations is very substantially reduced by the presence of the other components of the gelling agent, much less exacting processing controls are necessary as compared with those which have to be observed when attempting to employ low methoxyl pectin as the sole gelling agent and any variations in the calcium content of the fruit juice, unless extreme, are of little or no concern.

It is noteworthy that in the foregoing gel formulation the gelling agent, namely, the combination of low methoxyl pectin, locus bean gum, potassium-sensitive carrageenan and calcium-sensitive carrageenan, constituted only 0.889% of the gel. Another gel was prepared using the citrus fruit juice and citrus fruit section as in the foregoing example except that low methoxyl pectin was used as the sole gelling agent; and in order to obtain an equivalent gel strength it was necessary to employ about 1.49% of the low methoxyl pectin. It is apparent, therefore, that the combination used according to the present invention functions as a gelling agent much more efficiently and at much less cost while at the same time providing much improved physical properties.

When employing the gelling agent of this invention the total amount required may range from about 0.5% to about 3.0% by weight of the gel mix depending on the consistency desired and the presence or absence of chunks of fruit or other edible substance which cuts down the proportion of gelled aqueous liquid in the batch. On the basis of a non-fruit gel, namely, one which does not contain solid chunks, the quantity of the gelling agent may run from about 0.5% to about 2.0% of the gel, the amount ordinarily regarded as preferable being from about 0.60% to about 1.2%. This range for the quantity of the gelling agent also has applicability to the gelled liquid component of a gel having solid chunks distributed therein. For a gel formulation such as that above illustrated which contains citrus juice and citrus sections in approximately equal amount it ordinarily is preferable to employ about 0.5% to 1.4% of the gelling agent of this invention based on the weight of the complete dessert gel. The foregoing levels for the amount of the gelling agent of this invention are those which are suitable when the conditions are within the ranges which usually are appropriate for processing as regards pH, temperature and time. If unusual processing conditions are encountered which are abnormally severe as regards low pH, high temperature and prolonged periods of time in inducing hydrolysis, then the quantity levels would be higher in order to compensate for degradation.

In the above-exemplified formulation the potassium hydroxide reacts with the citric acid that occurs in the citrus fruit juice to form potassium citrate. Replacing the potassium hydroxide with potassium citrate will produce buffering of the gel composition at a slightly lower pH. A more tart-tasting gel can be obtained by not using a buffer salt and employing potassium chloride as an additional source of potassium ions when they are required.

In the foregoing formulation calcium cyclamate serves a double function in that it supplies low calorie sweetening and likewise contributes a quantity of calcium cations that is appropriate for effecting proper gelation of the low methoxyl pectin and the calcium-sensitive carrageenan. If sugar is employed as a sweetening agent, then the desired calcium cation concentration may be caused to be present by including an edible calcium salt in the formulation such as calcium adipate, calcium citrate, calcium acetate, calcium chloride or the like. Any such calcium salt may be incorporated as hereinabove described with reference to the incorporation of calcium cyclamate to provide in conjunction with any other calcium-containing material comprised in the gel formulation a calcium cation concentration relative to low methoxyl pectin that is of the order hereinabove mentioned.

In a gel composition such as that hereinabove exemplified particles of pulp contained in the fruit juice create a cloudy appearance such that any good grade of locust bean gum may be employed. If a clearer dessert gel is desired, then one should employ clarified locust bean gum.

In a gel formulation such as that exemplified hereinabove containing about equal parts of fruit juice and chunks or sections of fruit the relative proportions of the components of the gelling agent expressed as percentage by weight of the gel mix as a whole are substantially as follows:

| | Percent |
|---|---|
| Low methoxyl pectin | 0.3—0.8 |
| Locust bean gum | 0.1—0.4 |
| Potassium-sensitive gum selected from the group consisting of potassium-sensitive carrageenan and furcellaran | 0.075–0.2 |
| Calcium-sensitive carrageenan | 0.15–0.4 | subject to the proviso that the amount of locust bean gum shall be at least half the amount of potassium-sensitive gum.

Various other fruit juices and chunks of fruit also may be used such as apple, pineapple, pear, banana, etc. Moreover, vegetable juices and pieces of vegetable may be used such as tomato, cucumber, carrot, etc.

EXAMPLE 2

The following is illustrative of a dry particulate composition which may be added to hot water to produce a dessert gel:

| | Grams |
|---|---|
| Calcium surfate | 0.50 |
| Adipic acid | 2.50 |
| Potassium citrate | 1.25 |
| Sugar | 77.00 |
| Low methoxyl pectin | 2.00 |
| Potassium-sensitive carrageenan | 0.62 |
| Calcium-sensitive carrageenan | 1.19 |
| Locust bean gum | 0.95 |

The foregoing composition when reconstituted with one pint of water at a temperature of about 160° to 190° F. and permitted to cool to room temperature provided a satisfactory dessert gel.

I claim:

1. An aqueous dessert gel containing in effective amount as gelling agent therefor the combination in substantially the following relative proportions by dry weight of the gellng agent of

| | Percent |
|---|---|
| Low methoxyl pectin | 23–71 |
| Locust bean gum | 6.7–43 |
| Potassium-sensitive gum selected from the group consisting of potassium-sensitive carrageenan and furcellaran | 4.5–27 |
| Calcium-sensitive carrageenan | 9.6–46 | the amount of said locust bean gum being at least half as great as the amount of said potassium-sensitive gum and said dessert gel containing calcium cations in an amount effective to induce gelation of said low methoxyl pectin and said calcium-sensitive carrageenan and containing potassium cations in an amount effective to induce gelation of said potassium-sensitive gum.

2. An aqueous gel according to claim 1 wherein said aqueous gel comprises citrus fruit juice and wherein said gel has chunks of citrus fruit or pulp distributed therethrough.

3. An aqueous gel according to claim 2 which is at a pH or about 3.0 to 4.2.

4. An aqueous gel according to claim 1 wherein said calcium-sensitive carrageenan is an extract from a sea plant selected from the group consisting of *Eucheuma spinosum, Agardhiella tenera, Eucheuma serra, Eucheuma isiforme, Eucheuma muricatum, Eucheuma uncinatum, Gymnogongrus furcellatus, Ahnfeltia durvillaei,* and *Gigartina papillata.*

5. An aqueous gel according to claim 4 wherein said potassium-sensitive carrageenan is an extract from a sea plant selected from the group consisting of *Chondrus crispus, Eucheuma cottonii, Gigartina stellata, Gigartina pistillata, Gigartina canaliculata, Gigartina chamissoi, Eucheuma edule,* Hypnea, *Chondrus ocellatus, Eucheuma striatum* and *Eucheuma okamura.*

6. An aqueous gel according to claim 1 which contains from about 100 to about 2000 mg. of potassium cations per gram of potassium-sensitive gum and from about 10 to about 100 mg. of calcium cations per gram of low methoxyl pectin.

7. An aqueous gel according to claim 1 wherein the relative proportions by dry weight of the components of the gelling agent are approximately as follows:

| | Percent |
|---|---|
| Low methoxyl pectin | 41 |
| Locust bean gum | 21 |
| Potassium-sensitive gum selected from the group consisting of potassium-sensitive carrageenan and furcellaran | 13 |
| Calcium-sensitive carrageenan | 25 |

8. A gelling agent for providing a dessert gel which comprises in combination in substantially the following relative proportions by weight

| | Percent |
|---|---|
| Low methoxyl pectin | 23–71 |
| Locust bean gum | 6.7–43 |
| Potassium-sensitive gum selected from the group consisting of potassium-sensitive carrageenan and furcellaran | 4.5–27 |
| Calcium-sensitive carrageenan | 9.6–46 | the amount of said locust bean gum being at least half the amount of said potassium-sensitive gum.

9. A solid particulate composition which is adapted to be dissolved in heated water to form a solution which gels upon cooling and which comprises in substantially the following relative proportions of weight

| | Percent |
|---|---|
| Low methoxyl pectin | 23–71 |
| Locust bean gum | 6.7–43 |
| Potassium-sensitive gum selected from the group consisting of potassium-sensitive carrageenan and furcellaran | 4.5–27 |
| Calcium-sensitive carrageenan | 9.6–45 | the amount of said locust bean gum being at least half the amount of said potassium-sensitive gum, and said composition also containing edible water soluble potassium-containing material in an amount effective to induce gelation of said potassium-sensitive gum and edible calcium-containing material in an amount effective to induce gelation of said calcium-sensitive carrageenan and said low methoxyl pectin.

10. A solid particulate composition according to claim 9 wherein the potassium content of said potassuim-containing material is from about 200 to about 2000 mg. per gram of said potassium-sensitive gum and the calcium content of said calcium-containing material is from about 30 to about 40 mg. per gram of low methoxyl pectin.

References Cited
UNITED STATES PATENTS

| | | | |
|---|---|---|---|
| 2,466,146 | 4/1949 | Baker | 99—131 |
| 3,342,612 | 9/1967 | Foster et al. | 99—131 |
| 3,367,783 | 2/1968 | Billerbeck | 99—131 |

RAYMOND N. JONES, Primary Examiner

J. M. HUNTER, Assistant Examiner

U.S. Cl. X.R.

99—132